United States Patent [19]

Johnson

[11] Patent Number: 4,852,916

[45] Date of Patent: Aug. 1, 1989

[54] HIGH TEMPERATURE VACUUM PROBE

[76] Inventor: Keith D. Johnson, 20716 Church Lake Dr., Sumner, Wash. 98390

[21] Appl. No.: 145,456

[22] Filed: Jan. 19, 1988

[51] Int. Cl.$^4$ ............................................. F16L 55/00
[52] U.S. Cl. .................................... 285/187; 285/200; 285/206
[58] Field of Search ............... 425/504; 285/200, 175, 285/334.4, 187, 206, 207, 422, 355, 390

[56] References Cited

U.S. PATENT DOCUMENTS

| | | |
|---|---|---|
| 54,204 | 4/1866 | Presbrey . |
| 286,693 | 10/1883 | Fried . |
| 1,194,397 | 11/1959 | Discry . |
| 1,527,831 | 2/1925 | Borgner .......................... 285/200 X |
| 1,784,817 | 12/1930 | Bronson . |
| 2,322,043 | 6/1943 | McCune ................................. 303/88 |
| 2,411,743 | 11/1946 | Morner ................................ 144/281 |
| 2,435,466 | 2/1948 | Thomas ........................... 285/206 X |
| 2,646,997 | 7/1953 | Magos et al. ......................... 285/187 |
| 2,944,523 | 7/1960 | Werstein ................................ 121/32 |
| 2,962,757 | 12/1960 | Slemmons et al. ..................... 18/17 |
| 2,999,272 | 9/1961 | Warnken ................................ 18/19 |
| 3,137,898 | 6/1964 | Geringer ................................. 18/45 |
| 3,187,590 | 6/1965 | Duggan ................................... 74/13 |
| 3,226,138 | 12/1965 | Ellis ............................. 285/334.4 X |
| 3,410,144 | 11/1968 | Noz et al. ............................ 74/18.1 |
| 3,610,563 | 10/1971 | Allen ...................................... 249/65 |
| 3,666,600 | 5/1972 | Yoshino ............................... 156/382 |
| 3,674,394 | 7/1972 | Wiltshire ............................. 425/112 |
| 4,018,253 | 4/1977 | Kaufman ............................... 141/65 |
| 4,417,638 | 11/1983 | Harvey ................................ 180/125 |
| 4,554,036 | 11/1985 | Newsom ................................ 156/94 |
| 4,603,889 | 8/1986 | Welsh ............................. 285/355 X |
| 4,626,122 | 12/1986 | Harrison et al. ....................... 403/51 |

FOREIGN PATENT DOCUMENTS 414454  7/1974  U.S.S.R. .............................. 285/187

*Primary Examiner*—Dave W. Arola
*Attorney, Agent, or Firm*—Bruce A. Kaser

[57] ABSTRACT

A high-temperature vacuum probe has a body and base positioned on opposite sides of a vacuum bag's wall. These parts are connected together by a differential screw drive which causes the bag to be tightly pinched between them.

6 Claims, 2 Drawing Sheets

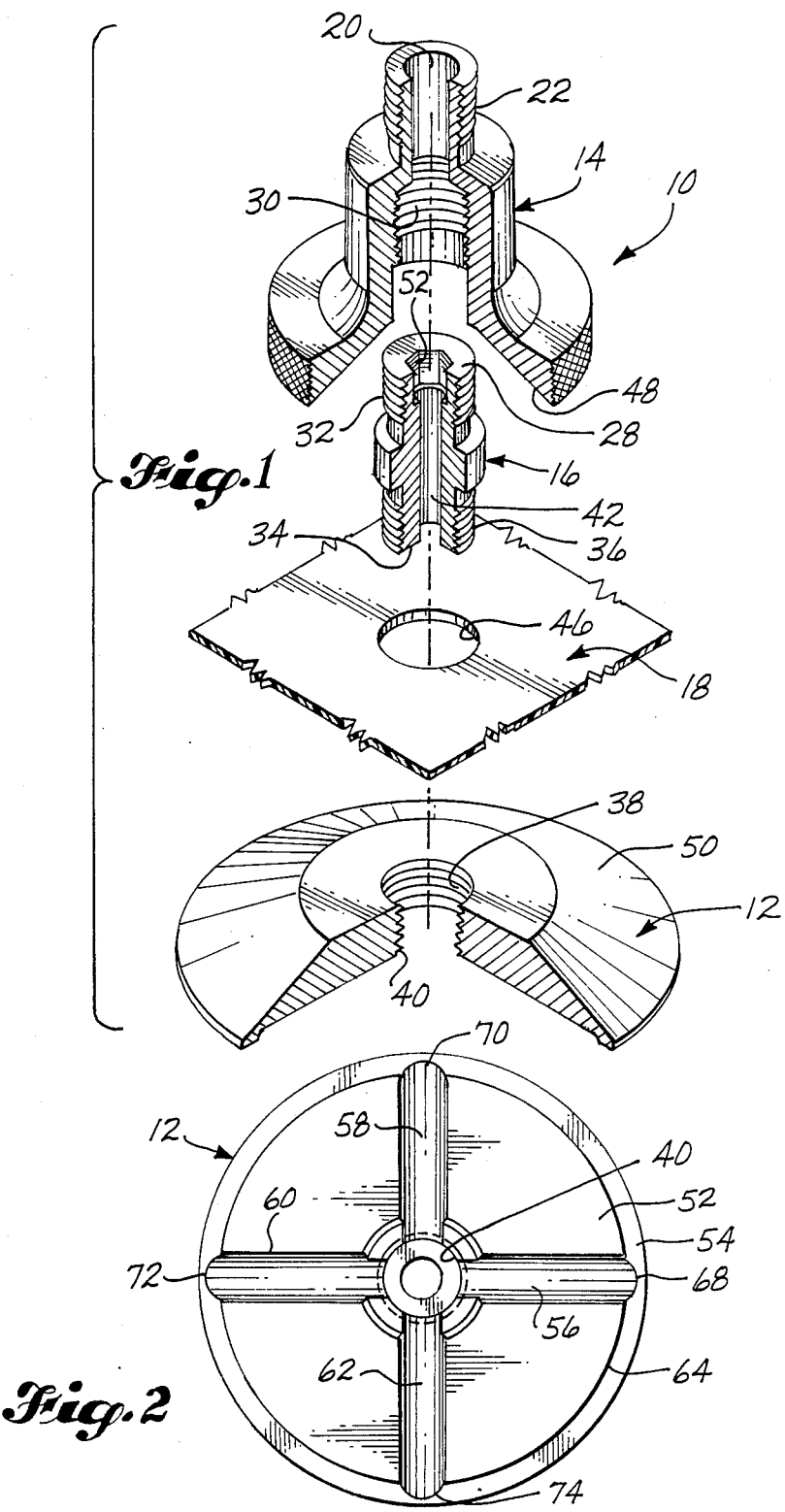

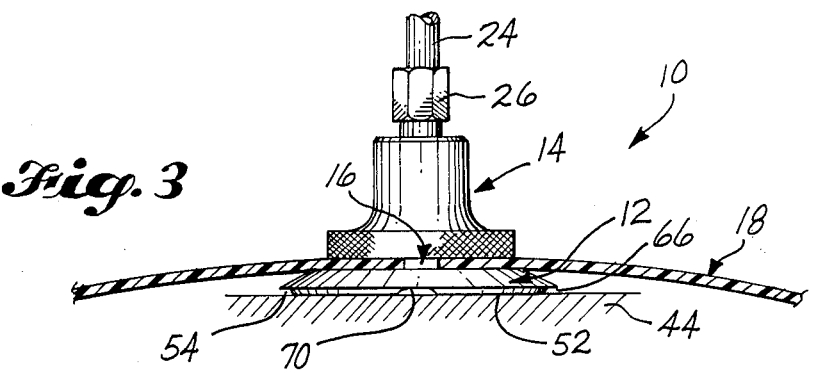
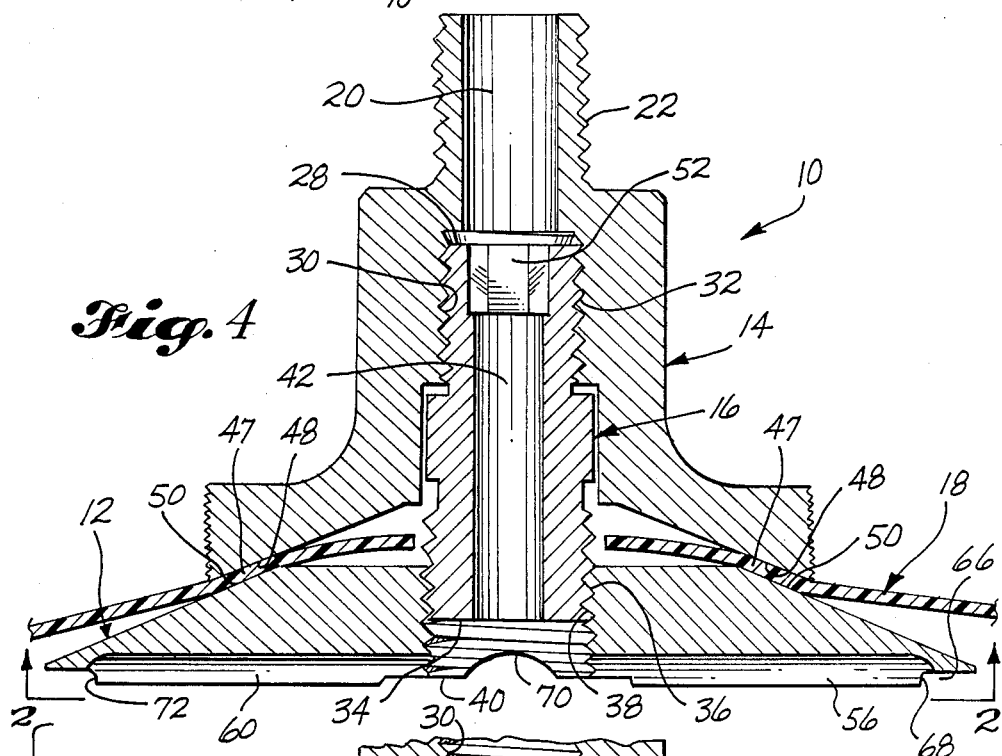
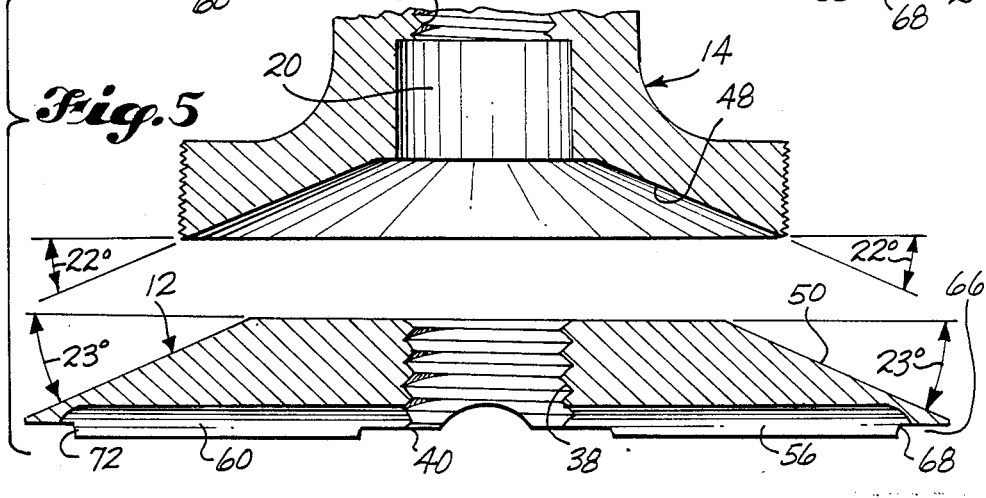

HIGH TEMPERATURE VACUUM PROBE

DESCRIPTION

1. Technical Field

This invention relates to manufacturing processes that employ vacuum bagging techniques to form composite materials. Specifically, this invention relates to devices that connect a vacuum line through a vacuum bag's wall.

2. Background Art

Using vacuum bags to form structural members made of composite material is a well-known manufacturing process. Typically, this involves placing an airtight bag around both a composite material and a mold, the mold being designed to shape the material during a heat-curing stage of the process. Air is removed from the bag thus creating an interior vacuum that causes exterior air pressure to force the bag's wall against the composite, thus urging it against the mold.

The vacuum is created by an air line extending through the bag's wall. Generally, this is accomplished by a special fitting or probe having a base and body part on each respective side of the wall. The base part rests on a suitable supporting surface inside the bag. The body part provides a coupling for connecting the probe to the air or vacuum line. A hollow pin, extending through a small hole made in the wall, provides a means for joining the probe's parts together. The pin also provides an air passageway through the probe that is connected to the air line. A washer-shaped rubber seal is placed between the probe's parts so that air cannot leak between them from around the pin.

The type of probe generally described above has been suitable for forming composite materials at relatively low curing temperatures. However, probes of this type cannot tolerate the elevated temperature levels of some of the more recent composite fabrication techniques. A known problem, for example, is that the probe's rubber seal degenerates at higher temperatures which consequently results in a leakage problem. In some cases, the temperatures are so high the materials used to make the probe's base and body parts cannot withstand them.

Further, in the above-described probe, the air passageway defined by the pin terminates in an air opening on the bottom surface of the probe's base. Since this surface normally rests on some sort of supporting surface, a number of channels or troughs are milled in the base's bottom which extend outwardly from the air opening. In one version of this particular probe, the channels terminate before they reach the base's edge. This has been a problem because downward pressure acting on the probe tends to force its bottom surface tightly against the supporting surface resulting in airflow "pinch-off", which makes bag evacuation impossible. In another version, the channel's do extend outwardly all the way to the base's edge. However, this results in a number of small air apertures being created around the edge. A past problem with this configuration is that during bag evacuation the bag's wall tends to be sucked into these apertures which causes a rupture of the bag.

The present invention represents an improved vacuum probe which overcomes the above problems. How this is accomplished will become apparent upon reading the following portions of this specification.

DISCLOSURE OF THE INVENTION

A vacuum probe constructed in accordance with this invention includes, much like previous probes, a body that is normally positioned on the outside of a vacuum bag, and a base normally positioned inside. In the present invention, however, the body part has a downwardly angled or tapered surface that is shaped for mating fitment with an upper surface of the base part. The base's mating surface is also tapered, but at an angle which is slightly greater than the body's surface. These angles interfere with each other and cause the bag to be pinched therebetween when the body is joined to the base.

Both parts have an axially threaded opening and are interconnected by a rotatable screw drive member. The thread pitch of the screw drive's connection to the base part is greater than the thread pitch of its connection to the body part. This provides a differential drive for urging the body part toward the base, causing the bag's wall to be tightly pinched between the probe's mating surfaces. The probe's body and screw drive member are made of different metals. The body is made of a metal having a greater co-efficient of thermal expansion than the screw drive which further enhances the probe's bag-pinching action as it increases in temperature.

The probe's base has a first bottom surface portion that is normally in contact with a suitable supporting surface inside the bag. This portion has a central opening that is connected to the air or vacuum line. Radiating outwardly from this opening is a plurality of troughs which connect it to the first surface portion's outer edge or periphery. This edge is surrounded by a second bottom surface portion that is offset vertically from the first. This configuration defines a small space underneath the outer perimeter of the base part, which leads into the troughs. Functionally, the space causes a more diffused airflow from inside the bag through the probe.

As discussed above, earlier probes have used rubber seals in order to prevent leakage. An advantage to the present invention is that it has eliminated the need for this or any other type of seal. The above-disclosed differential screw drive, in combination with the probe's pinching surfaces, results in an extremely tight gripping action of the bag wall. This action is enhanced at elevated temperatures because the body thermally expands at a greater rate than the screw drive member.

Another advantage to the present invention is that the spaced region underneath the base part's outer edge reduces the above-described problems concerning blockage of airflow during evacuation. The reason for this is that this configuration insures an airflow path through the base at all times and yet the diffused airflow created thereby eliminates localized areas of high suction.

BRIEF DESCRIPTION OF THE DRAWINGS

In the drawings, like reference numerals and letters refer to like parts throughout the various views, and wherein:

FIG. 1 is an exploded view of a vacuum probe constructed in accordance with a preferred embodiment of the invention, the further shows a fragmentary portion of a vacuum bag wall and how such portion is positioned relative to the probe's parts;

FIG. 2 is a bottom plan view of the base of the probe shown in FIG. 1;

FIG. 3 is a side elevational view of the probe shown in FIG. 1, and shows the probe in operation to provide a vacuum line through a vacuum bag's wall;

FIG. 4 is an enlarged cross-sectional view of the probe and bag wall shown in FIG. 3; and FIG. 5 is a fragmentary cross-sectional view of the mating surfaces of the probe's body and base parts.

BEST MODE FOR CARRYING OUT THE INVENTION

In the drawings, and referring first to FIG. 1, therein is shown generally at 10 a vacuum probe constructed in accordance with a preferred embodiment of the invention. The probe consists of a base part 12, a body part 14 and an axial screw drive member 16 which interconnects the base and body. FIG. 1 also shows a section of vacuum bag wall 18 that is normally gripped or pinched between the base and body 12, 14.

The body 14 has an axial opening 20 extending through its entire length. An externally threaded neck portion 22 permits this opening to be connected to a vacuum line 24 (see FIG. 3). This connection is made by a conventionally known threaded coupling 26.

The diameter of opening 20 increases below neck portion 22 in order to accommodate the upper end 28 of screw drive 16. This part of the opening, which is indicated at 30, has internal threads that engage with external threads 32 on the screw drive's upper end 28. The screw drive's lower end 34 similarly has external threads 36 that engage with internal threads 38 of another opening 40 in base 12. This latter opening 40 extends from the base's top to its bottom. The screw drive 16 includes an axial passageway 42 which provides an airflow connection from vacuum line 24 to the lower extremity of opening 40.

In preferred form, the threaded engagement of the screw drive's lower end 34 is made at a certain thread pitch which is greater than the thread pitch engagement of its upper end 28. For definitional purposes, "thread pitch" should be taken to mean the distance traveled by a threaded screw or bolt in a single revolution. Preferably, the drive's upper end 32 has a diameter of ½ inch and thirteen threads per axial inch. Its lower end 36 has a diameter of 9/16 of an inch and twelve threads per axial inch. The internal threads 30, 38 in the body and base 14, 12 are, of course, dimensioned accordingly.

The purpose of the different thread pitch is to provide differential tightening of the body 14 relative to the base 12. When the probe 10 is in use, the body 18 is first positioned between the disassembled components of the probe. The probe's base 12 is normally positioned upon some suitable supporting surface 44 inside the bag 18 (see FIG. 3). The screw drive 16 is placed through an opening 46 in the bag, and is screwed into base opening 40. Although bag opening 46 is shown to be circular, it should be understood that normally it is made by simply cutting a slit in the bag 18.

The probe's body 14 is then screwed onto the screw drive's upper end 28, until a circular region 47 of the bag 18 is pinched between surfaces 48 and 50 of the body and base 14, 12, respectively. This is followed by finger tightening of the screw drive 16, with the above-described differential thread pitch causing an extreme clamping pressure to occur between mating surfaces 48 and 50.

Finger-tightening is accomplished by a conventional socket 52 in the screw drive's upper end 28, which is sized for an Allen wrench. It would be understood that such a wrench would normally extend downwardly through axial opening 20 and finger tightening would take place before the vacuum line 24 is connected to the probe 10.

In preferred form, the body's bag-pinching surface 48 is tapered or angled downwardly at an angle of 22° from the horizontal. The base's upwardly directed pinching surface 47 is preferably angled at 23° from the horizontal. This difference, which is illustrated in FIG. 5, enhances bag-pinching action.

Referring now to FIG. 2, the bottom of base 12 includes a first inner circular portion 52 which is surrounded by a second, outer portion 54. Normally, inner portion 52 rests directly on supporting surface 44, as is shown in FIG. 3. In order to provide an airflow from the base opening 40, a plurality of at least four channels or troughs 56, 58, 60, 62 connect this opening 40 to the first surface portion's outer edge or periphery 64. Normally, these troughs are semi-circular in cross-section, and are milled directly into the base's bottom surface 52.

The second or outer base surface portion 54 is offset vertically from the first, which is best seen in FIGS. 4 and 5. This creates a spaced area or region 66 around base surface portion 52 and underneath outer portion 54. The purpose of this is to diffuse evacuating airflow as it enters the exterior ends 68, 70, 72, 74 of the troughs 56, 58, 60, 62.

In preferred form the screw drive 16 is made of a suitable steel, and the body 14 is made of brass. As a person skilled in the art would know, what this means is the co-efficient of thermal expansion of the body is greater than that for the screw drive 12. When the probe is in use and its temperature increases, the difference in thermal expansion enhances the above-described bag-pinching action.

Having thus described a preferred embodiment of the invention, it is to be understood the above description is not to be taken in a limiting sense. As has been established by the patent laws, patent protection is to be defined by the subjoined patent claims and not the above description.

What is claimed is:

1. A vacuum probe device for use in connecting a vacuum line through a sheet of material, comprising:
   a sheet of material;
   a body, positioned on one side of said sheet, having a downwardly facing recess with a tapered pinching surface;
   a base, positioned on the other side of said sheet, having an upwardly facing tapered pinching surface that is sized to be at least partially received in said body's downwardly facing recess, with said sheet of material positioned between said tapered pinching surfaces said body and said base each having a threaded opening; and
   a rotatable screw member interconnecting said base and body, said screw member having an end portion in threaded engagement with said opening in said body, said engagement being defined by a first thread pitch, and another end portion in threaded engagement with said opening in said base, said latter engagement being defined by a second thread pitch which is greater than said first thread pitch, wherein rotation of said screw member causes said screw member to act as a differential screw drive for urging said body's pinching surface toward said base's pinching surface, to pinch at least a portion of said sheet therebetween.

2. The probe of claim 1, wherein said pinching surface of said body is tapered at a certain angle from horizontal, and wherein said pinching surface surface of said base is tapered at an angle from horizontal that is slightly greater than the taper of said body's pinching surface.

3. The probe of claim 1, wherein said boy is made of a first metal and said screw member is made of a second metal, said first metal having a greater co-efficient of thermal expansion than said second metal.

4. The probe of claim 3, wherein said body is made of brass and said screw member is made of steel.

5. In a vacuum bagging process wherein a vacuum probe connects a vacuum line to an interior area within a vacuum bag the bag having a wall through which the probe passes, said probe including a body portion connected to a base portion in a manner so that at least a portion of said bag's wall is sandwiched therebetween, said base portion being located in said interior area and normally resting on a supporting surface therein, an improved base portion comprising:
  a bottom surface having a vacuum opening for providing an airflow communication pathway to said vacuum line, said bottom surface normally resting upon said supporting surface in said interior area, and having
  a peripheral edge bordering said bottom surface, wherein said edge is offset vertically upwardly relative to said bottom surface, in a manner so as to define a space underneath said edge,
  at least one trough in said bottom surface, said trough defining an airflow path from said vacuum opening to said space underneath said edge.

6. A vacuum probe device for use in connecting a vacuum line through a sheet of material during the forming of a composite material at elevated temperatures, comprising:
  a body made of a first metal and having a downwardly directed recessed pinching surface positioned on one side of said sheet;
  a base having an upwardly directed pinching surface positioned on the other side of said sheet, at least a portion of which is sized to be received in said body's recess with said sheet positioned between said pinching surfaces; and
  a rotatable screw drive member having means operable to urge said body's pinching surface toward said base's pinching surface, to pinch at least a portion of said sheet between said surfaces, said screw drive member being made of a second metal, and wherein said first metal has a greater co-efficient of thermal expansion than said second metal, to increase said device's pinch on said sheet when said device is subjected to said elevated temperatures.

* * * * *

UNITED STATES PATENT AND TRADEMARK OFFICE
CERTIFICATE OF CORRECTION

PATENT NO. : 4,852,916

DATED : August 1, 1989

INVENTOR(S) : Keith D. Johnson

It is certified that error appears in the above-identified patent and that said Letters Patent is hereby corrected as shown below:

Column 2, line 64, "the", second occurrence, should be -- and --.

Claim 1, column 4, line 52, "recess, with" should be -- recess with --; and in line 54, "surfaces said" should be -- surfaces, said --.

Claim 2, column 5, line 3, delete "surface", second occurrence.

Signed and Sealed this

Twelfth Day of June, 1990

Attest:

HARRY F. MANBECK, JR.

*Attesting Officer*         *Commissioner of Patents and Trademarks*